(12) United States Patent
Korekado et al.

(10) Patent No.: US 8,768,010 B2
(45) Date of Patent: Jul. 1, 2014

(54) DISTANCE MEASURING APPARATUS, DISTANCE MEASURING METHOD, AND PROGRAM

(75) Inventors: Keisuke Korekado, Wako (JP); Tomoyuki Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 13/496,137

(22) PCT Filed: Sep. 8, 2010

(86) PCT No.: PCT/JP2010/065368
§ 371 (c)(1),
(2), (4) Date: Mar. 14, 2012

(87) PCT Pub. No.: WO2011/033971
PCT Pub. Date: Mar. 24, 2011

(65) Prior Publication Data
US 2012/0177252 A1  Jul. 12, 2012

(30) Foreign Application Priority Data

Sep. 15, 2009  (JP) ................................ 2009-213420

(51) Int. Cl.
*G06K 9/00* (2006.01)
(52) U.S. Cl.
USPC ........................................................ 382/106
(58) Field of Classification Search
None
See application file for complete search history.

(56) References Cited

U.S. PATENT DOCUMENTS

| | | | | | |
|---|---|---|---|---|---|
| 5,455,621 | A | * | 10/1995 | Morimura | 348/229.1 |
| 5,754,280 | A | * | 5/1998 | Kato et al. | 356/3.06 |
| 7,436,496 | B2 | * | 10/2008 | Kawahito | 356/5.01 |
| 7,589,826 | B2 | | 9/2009 | Mack et al. | |

FOREIGN PATENT DOCUMENTS

| | | | | |
|---|---|---|---|---|
| DE | 102006060108 A1 | | 6/2008 | |
| JP | 8-313215 A | | 11/1996 | |
| JP | 09-197045 A | | 7/1997 | |
| JP | 2000098478 A | * | 4/2000 | ............ G03B 17/18 |
| JP | 3074967 B2 | | 6/2000 | |
| JP | 2001-281336 A | | 10/2001 | |

(Continued)

OTHER PUBLICATIONS

International Search Report and Written Opinion corresponding to International Application No. PCT/JP2010/065368 dated Dec. 14, 2010.

(Continued)

*Primary Examiner* — Stephen R Koziol
*Assistant Examiner* — Delomia Gilliard
(74) *Attorney, Agent, or Firm* — Squire Sanders (US) LLP

(57) ABSTRACT

Disclosed are a distance measuring apparatus which can measure the distance to an object with high accuracy, a distance measuring method, and a program. The distance measuring apparatus is provided with: a light source which emits light; an image pickup unit, which picks up an image of light which has been emitted from the light source and reflected by means of the object; an image distance data converting unit, which converts image data obtained by the image pickup performed by the image pickup unit into image distance data which indicates the distance to the object; an image pickup condition setting unit, which sets first image pickup conditions on the basis of the image distance data; and an image pickup control unit, which controls the light source and the image pickup unit and have an image of the object picked up under the first image pickup conditions.

15 Claims, 8 Drawing Sheets

(56) References Cited

FOREIGN PATENT DOCUMENTS

| | | | |
|---|---|---|---|
| JP | 2002-064449 A | | 2/2002 |
| JP | 2008-145263 A | | 6/2008 |
| JP | 2008145263 A | * | 6/2008 |
| JP | 2009-047460 A | | 3/2009 |
| JP | 2009047460 A | * | 3/2009 |

OTHER PUBLICATIONS

Office Action dated Nov. 21, 2013 corresponding to German Patent Application No. 112010003649.7 and English translation thereof.

R. Miyagawa et al., "CCD-Based Range-Finding Sensor," IEEE Transactions on Electron Devices, vol. 44, No. 10, Oct. 1997, pp. 1648-1652.

* cited by examiner

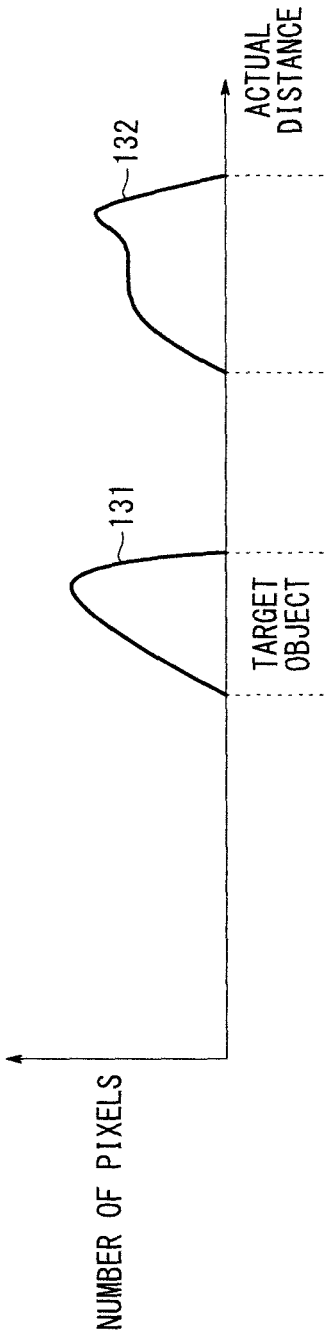
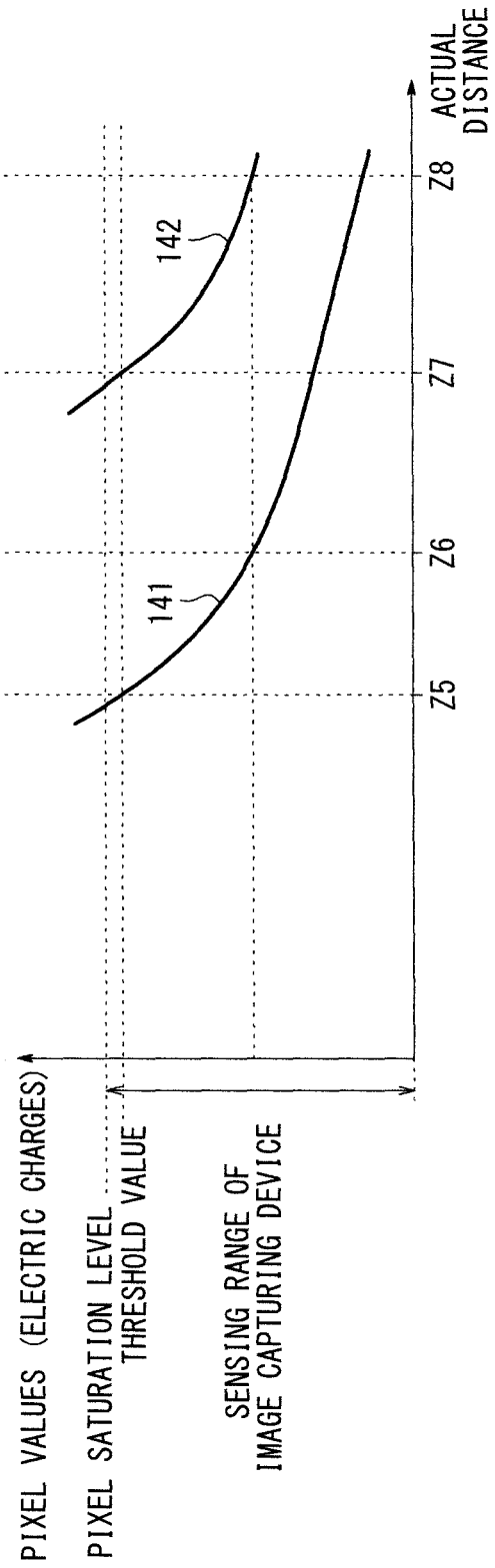
FIG. 3A
FIG. 3B

DISTANCE MEASURING APPARATUS, DISTANCE MEASURING METHOD, AND PROGRAM

TECHNICAL FIELD

The present invention relates to a distance measuring apparatus, a distance measuring method, and a program, and more particularly to distance measuring apparatus, a distance measuring method, and a program for measuring the distance up to subject with an image capturing device.

BACKGROUND ART

It is known to use an image capturing device as a distance measuring sensor according to a time-of-flight (TOF) process, as disclosed in Japanese Laid-Open Patent Publication No. 2001-281336 and Japanese Laid-Open Patent Publication No. 08-313215. According to the TOF process, light is applied to a subject, and the period of time required for the emitted light to return from the object is measured to measure the distance up to the subject.

It is also known, as disclosed in Japanese Patent No. 3074967 and Japanese Laid-Open Patent Publication No. 2002-064449, to combine two sets of image data generated by capturing two images in long- and short-time exposure modes, respectively, in a process of sensing high- and low-luminance images with an image capturing device, for producing image data having a wide dynamic range even if there is a large luminance difference between the high- and low-luminance images.

SUMMARY OF THE INVENTION

When an image capturing device is used as a distance measuring sensor, a light source applies light to a subject. The light that reaches the subject is attenuated at a rate proportional to the square of the distance between the light source and the subject. If the light source is adjusted to apply light to a near subject, then the light emitted from the light source becomes less intensive when it reaches a far subject, and the accuracy with which to measure the distance up to the far subject is lowered. Conversely, if the light source is adjusted to apply light to a far subject, then the light emitted from the light source becomes more intensive when it reaches the near subject, tending saturating the pixels of the image capturing device, which is thus unable to measure the distance up to the near subject.

The present invention has been made in view of the above problems of the background art. It is an object of the present invention to provide a distance measuring apparatus, a distance measuring method, and a program which are capable of measuring the distance up to a subject with increased accuracy.

To achieve the above object, there is provided in accordance with the present invention a distance measuring apparatus comprising a light source for emitting light, an image capturing unit for capturing an image of a subject based on the light emitted from the light source and reflected from the subject, a distance information converter for converting pixel values of pixels which are obtained by the image capturing unit when the image capturing unit captures the image of the subject, into distance information representing the distance up to the subject, an image capturing condition setting section for setting first image capturing conditions based on the distance information, and an image capture controller for controlling the light source and the image capturing unit to capture the image of the subject under the first image capturing conditions.

The image capturing condition setting section may set the first image capturing conditions such that the pixel values of the pixels that detect light reflected from a subject positioned at a shortest distance serve as a first threshold value.

The distance measuring apparatus may further include a distance measurement accuracy analyzer for analyzing a distance measurement accuracy under the first image capturing conditions and identifying an accuracy lowering distance at which the distance measurement accuracy is worse than a certain value, wherein the image capturing condition setting section may set second image capturing conditions for obtaining luminance information brighter than the first image capturing conditions if the subject is present at a distance farther than the accuracy lowering distance, and the image capture controller may control the light source and the image capturing unit to capture the image of the subject under the first image capturing conditions and the second image capturing conditions.

The distance measuring apparatus may further include a distance information combiner for combining the distance information converted from the pixel values when the image of the subject is captured under the first image capturing conditions and the distance information converted from the pixel values when the image of the subject is captured under the second image capturing conditions, with each other.

The image capturing condition setting section may set second image capturing conditions such that the pixel values of the pixels that detect light reflected from a portion, located at a shortest distance, of the subject that is present at the distance farther than the accuracy lowering distance serve as a second threshold value.

The distance measuring apparatus may further include a distance change calculator for calculating the degree to which the distance up to the subject changes, and a threshold value changer for changing at least one of the first threshold value and the second threshold value depending on the degree to which the distance up to the subject changes, wherein the image capturing unit may comprise a two-dimensional matrix of pixels, the distance information converter may convert each of pixel values of the pixels which are generated when the image capturing unit captures the image of the subject, into distance information to obtain one image distance data, and the distance change calculator may calculate the degree to which the distance up to the subject changes by comparing a plurality of image distance data.

The difference between the second threshold value and a saturated pixel value may be greater than the difference between the first threshold value and the saturated pixel value.

The subject may comprise a subject selected by a user or a subject whose image is captured in a certain area of a two-dimensional matrix of pixels.

To achieve the above object, there is also provided in accordance with the present invention a distance measuring method, including a light emitting step of emitting light from a light source, an image capturing step of capturing, with an image capturing unit, an image of the subject based on the light emitted from the light source and reflected from the subject, a distance information converting step of converting, with a distance information converter, pixel values of pixels which are obtained by image capturing, into distance information representing the distance up to the subject, an image capturing condition setting step of setting, with an image capturing condition setting section, first image capturing conditions based on the distance information, and an image capture controlling step of controlling, with an image capture controller, the light source and the image capturing unit to capture the image of the subject under the first image capturing conditions.

To achieve the above object, there is further provided in accordance with the present invention a program for enabling a distance measuring apparatus including a light source for emitting light and an image capturing unit for capturing an image of a subject based on the light emitted from the light source and reflected from the subject, to function as a distance information converter for converting pixel values of pixels which are obtained when the image capturing unit captures the image of the subject, into distance information representing the distance up to the subject, an image capturing condition setting section for setting first image capturing conditions based on the distance information, and an image capture controller for controlling the light source and the image capturing unit to capture the image of the subject under the first image capturing conditions.

According to the present invention, the distance measurement accuracy is increased to make it possible to measure the distance up to the subject accurately.

BRIEF DESCRIPTION OF THE DRAWINGS

FIGS. 3A and 3B are diagrams illustrative of characteristic curves representing image capturing conditions required to obtain image distance data needed for a combining process in the event that there are a plurality of subjects;

DESCRIPTION OF EMBODIMENTS

A distance measuring apparatus according to a preferred embodiment of the present invention will be described in detail below with reference to the accompanying drawings.

Figure 1:
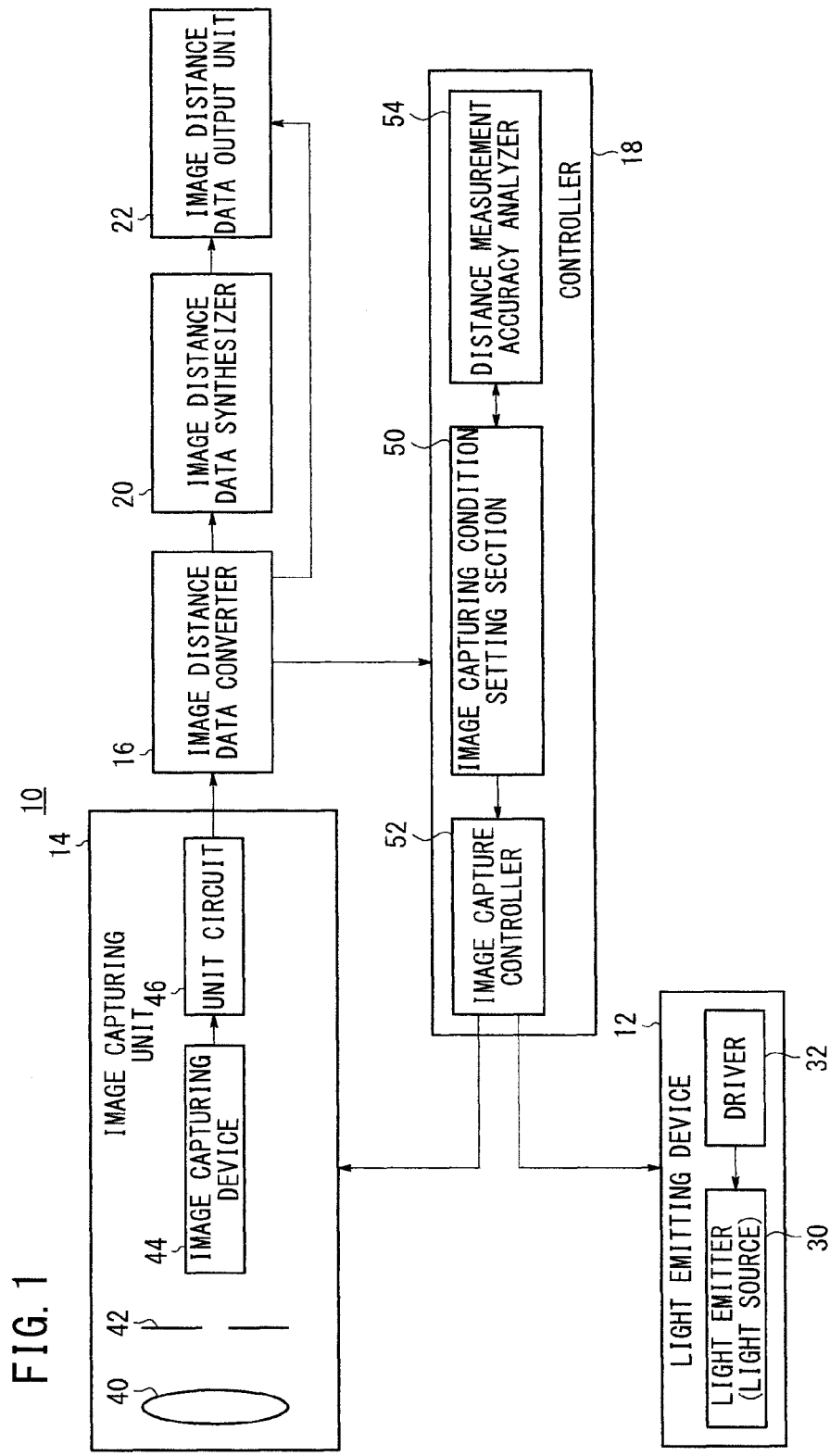
FIG. 1 is a block diagram showing a general electric configuration of a distance measuring apparatus according to an embodiment of the present invention.

FIG. 1 is a block diagram showing a general electric configuration of a distance measuring apparatus according to an embodiment of the present invention. The distance measuring apparatus 10 includes a light emitting device 12, an image capturing unit 14, an image distance data converter (distance information converter) 16, a controller 18, an image distance data synthesizer (distance information combiner) 20, and an image distance data output unit 22. An information processing apparatus such as CPUs or the like functions as the distance measuring apparatus 10 by reading programs recorded in a memory, not shown.

The light emitting device 12 has a light emitter (light source) 30 for emitting light and a driver 32 for energizing the light source 30 to emit the light. The driver 32 energizes the light source 30 to emit the light according to image capturing conditions sent from the controller 18, which control the intensity of the emitted light, the time during which the light is emitted, and the timings of emission of the light, etc. The light emitting device 12 applies the light emitted from the light source 30 to a subject. The light emitting device 12 may apply light which is modulated in intensity.

The image capturing unit 14 has a lens 40, a diaphragm 42, a diaphragm drive circuit, not shown, for actuating the diaphragm 42, an image capturing device 44, and a unit circuit 46. The diaphragm 42 controls the amount of light applied to the image capturing device 44. The diaphragm drive circuit actuates the diaphragm 42 according to image capturing conditions set by the controller. The amount of light applied to the image capturing device 44 varies depending on how much the diaphragm 42 limits the amount of light passing therethrough (aperture value), the exposure time, and the amount of light emitted from the light emitting device 12.

The image capturing device 44 captures an image of a subject through the lens 40 and the diaphragm 42. The image capturing device 44 is controlled to capture images of a subject and produce image data thereof at a constant periodic interval (constant frame rate) of 30 fps, for example. The image capturing device 44 may not capture images of a subject at a constant periodic interval. For example, time intervals between captured images may be different from each other. If images are to be captured under different image capturing conditions, then the image capturing device 44 may not capture images of a subject at a constant periodic interval. Capturing an image refers to photoelectrically converting detected light into electric charges and accumulating the electric charges. The image capturing device 44 includes pixels each for photoelectrically converting detected light into electric charges and accumulating the electric charges. The image data refer to a collection of electric charges accumulated by the pixels, i.e., pixel values detected by the pixels. The image capturing device 44 has a function as an electronic shutter, which is capable of adjusting the exposure time of the image capturing device 44. The image capturing device 44 may output electric charges accumulated at a constant periodic interval of 30 fps, for example, to the unit circuit 46. The image capturing device 44 may comprise a CCD or a CMOS.

The unit circuit 46 has an A/D converter for converting an analog signal representative of image data output from the image capturing device 44 into a digital signal (A/D conversion). The A/D converter converts an analog signal into a digital signal, per pixel. The A/D converter may have its gain (conversion gain) variable. The image capturing unit 14 outputs the electric charges of the respective pixels to the image distance data converter 16.

The image distance data converter (distance information converter) 16 converts captured image data into image distance data according to a TOF process. The TOF process will not be described in detail below as it is well known in the art. In order to obtain image distance data according to the TOF process, the image capturing unit 14 captures a plurality of images of a subject at different image capturing timings, and the image distance data converter 16 produces data for one range image from data for a plurality of images obtained.

The image distance data converter 16 converts the pixel value of each pixel into distance data, thereby producing distance data, per pixel, which are representative of distances from the respective pixels to the subject detected by the respective pixels. The distance data associated with the respective pixels will hereinafter be referred to as pixel distance data (distance information). The pixel distance data are collected into image distance data. Though the image distance data are not image data, they are called that way because they represent a matrix of pixel distance data.

The distances from the respective pixels to the subject are thus obtained. The image distance data converter 16 outputs the image distance data to the controller 18, the image distance data synthesizer 20, and the image distance data output unit (distance information output unit) 22. One image distance data is produced by converting image data produced during one frame period. The image distance data converter 16 may comprise a processor such as a DSP or the like. The image capturing unit 14 captures a plurality of images during one frame period, and the image distance data converter 16 produces one image distance data from data for a plurality of images obtained from the image capturing.

The controller 18 has an image capturing condition setting section 50, an image capture controller 52, and a distance measurement accuracy analyzer 54. The controller 18 may comprise a processor such as a CPU or the like. The image capturing condition setting section 50 analyzes the pixel distance data of the image distance data, and generates a histogram of the subject. The histogram represents the distance up to the subject and the number of pixels. Based on the generated histogram, the image capturing condition setting section 50 sets image capturing conditions optimum for the distance up to the subject. The image capturing conditions include the amount of light that is emitted from the light emitting device 12 to the subject, i.e., the amount of light emitted by the light source 30, the exposure time during one frame period of the image capturing device 44, the aperture value of the diaphragm 42, and the gain value. Since the image capturing unit 14 captures a plurality of images during one frame period, the exposure times for the respective images during one frame period are also set as image capturing conditions.

The image capture controller 52 controls the light emitting device 12 to emit light under the set image capturing conditions. The image capture controller 52 also controls the image capturing unit 14 to capture images of the subject under the set image capturing conditions. Specifically, the image capture controller 52 controls the diaphragm 42 according to the set aperture value, and exposes the image capturing device 44 to the light for the set exposure time. The image capture controller 52 also controls the unit circuit 46 to adjust its gain to the set gain value. The image capturing unit 14 is thus capable of capturing images depending on the distance up to the subject. For example, the image capturing unit 14 is capable of capturing images of the subject when the subject is located at a short distance and at a long distance.

The distance measurement accuracy analyzer 54 analyzes the image capturing conditions set by the image capturing condition setting section 50 and identifies a distance (a position at a distance) at which the distance measurement accuracy is lower than a certain value. The distance measurement accuracy analyzer 54 also judges whether image distance data are to be combined or not based on the analyzed distance measurement accuracy. For example, the distance measurement accuracy analyzer 54 decides that image distance data are to be combined if the subject is present at a position farther than the position at which the distance measurement accuracy is lower than the predetermined value.

The image distance data synthesizer (distance information combiner) 20 combines a plurality of image distance data produced from images captured by the image capturing unit 14 under different image capturing conditions with respect to a subject at different distances and converted by the image distance data converter 16. In other words, the image distance data synthesizer 20 synthesizes image distance data from a plurality of image distance data. The image distance data synthesizer 20 may comprise a processor such as a DSP or the like.

Figure 2A:
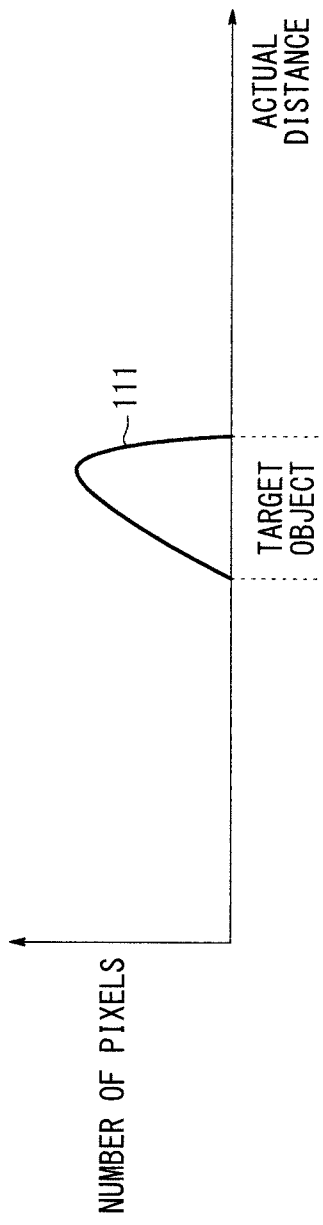
FIGS. 2A and 2B are diagrams illustrative of the principles of a process of setting image capturing conditions by a controller.
Figure 2B:
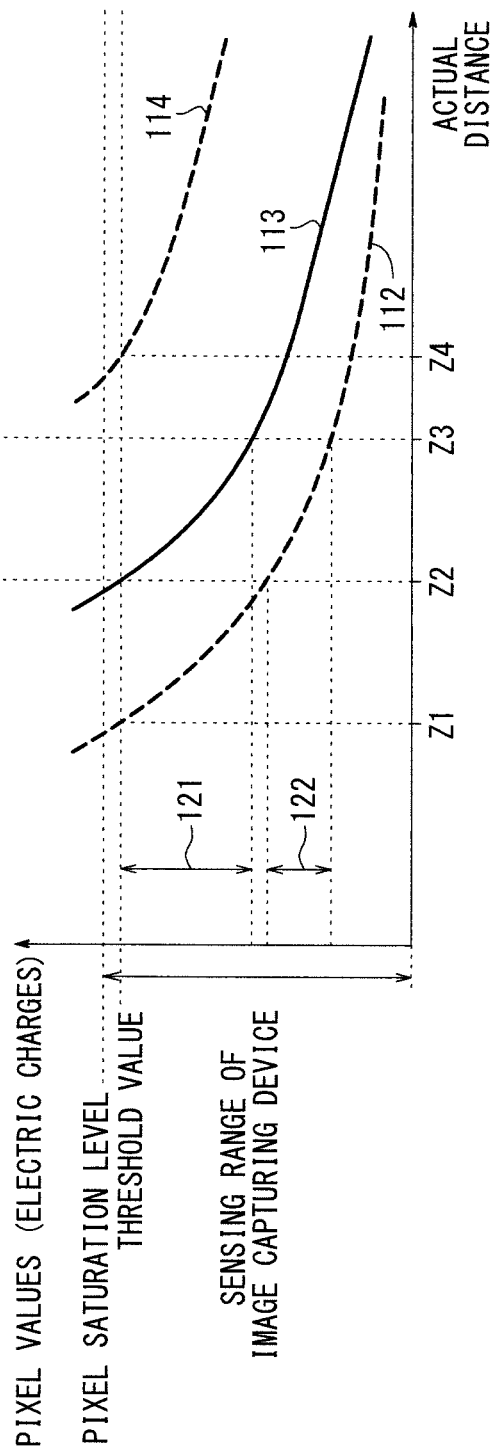

FIGS. 2A and 2B are diagrams illustrative of the principles of a process of setting image capturing conditions by the controller 18. FIG. 2A shows a histogram of a subject 111 distributed between a distance Z2 and a distance D3. The histogram has a vertical axis representing the number of pixels. Image capturing conditions are adjusted to measure the distance up to the subject 111 with higher accuracy. For measuring the distance with higher accuracy, it is necessary to capture the subject under given image capturing conditions or desired capturing conditions, and measure the distance up to the subject in advance (pre-measurement mode or preliminary measurement mode). The histogram shown in FIG. 2A is obtained in the pre-measurement mode. The distance up to the subject 111 which is obtained in the pre-measurement mode may possibly be different from the actual distance (the measurement accuracy is low). The subject does not refer to each object such as a person, a building, a bridge, a cat, or the like, but refers to anything captured by the image capturing unit 14. The subject 111 may include a plurality of objects such as persons, buildings, etc.

FIG. 2B shows characteristic curves, which represent image capturing conditions, of electric charges accumulated in the pixels of the image capturing device under image capturing conditions. As described above, since the intensity of light applied by the light emitting device 12 is attenuated at a rate proportional to the square of the distance, the characteristic curves representing the accumulated electric charges indicate that as the distance becomes greater, the electric charges vary to a smaller degree per unit distance. A characteristic curve 112 is a curve according to which the electric charges accumulated in the pixels (pixel values) at the time an image of a subject at a distance Z1 is captured serve as a threshold value. The characteristic curve 112 has its absolute value gradient greater in a section thereof where the pixel values are higher. When the pixel values are subjected to A/D conversion, the resolution of the pixel values is higher in the section of the characteristic curve 112 with the greater gradient. Conversely, the characteristic curve 112 has its absolute value gradient smaller in a section thereof where the pixel values are lower. When the pixel values are subjected to A/D conversion, the resolution of the pixel values is lower in the section of the characteristic curve 112 with the smaller gradient. It is not possible to accurately measure the distance up to the subject using those pixel values.

If the subject 111 is not positioned between the distances Z1, Z2, then the pixel values of the pixels that detect the light reflected from the subject 111 are not in a high resolution range, and the accuracy with which to measure the distance up to the subject is cannot be increased using those pixel values. Since the subject 111 whose image is to be captured is actually positioned between the distances Z2, Z3, the pixel values of the pixels that detect the light reflected from the subject 111 fall in a range 122 which is a low resolution range according to the characteristic curve 112.

A characteristic curve 114 is a curve according to which the pixel values generated at the time an image of a subject at a distance Z4 is captured serve as a threshold value. Inasmuch as the subject 111 is positioned between the distances Z2, Z3 which are shorter than the distance Z4, the pixels that detect the light reflected from the subject 111 are saturated, causing an overflow of accumulated electric charges. Therefore, effective pixel values cannot be produced according to the characteristic curve 114.

The image capturing conditions are then changed to image capturing conditions represented by a characteristic curve 113 according to which the pixel values generated by the pixels which detect light reflected from a portion of the subject 111 that is located in a closest position at the distance Z2 serve as a threshold value. According to the characteristic curve 113, the pixel values, i.e., the electric charges accumulated in the pixels which detect light reflected from the subject 111, fall in a range 121 which is a high resolution range for increasing the accuracy with which to measure the distance up to the subject 111. Pixels which have detected the light reflected from the portion of the subject 111 that is located at the distance Z2 are identified from the pixel values of the pixels of the image capturing device 44. For example, those pixels whose pixel values are maximal may be identified as pixels which have detected the light reflected from the portion of the subject 111 that is located at the distance Z2. The characteristic curve 112 may be switched to the characteristic curve 113 by increasing the amount of light that is emitted from the light emitting device 12, increasing the exposure time, or reducing the aperture value. The characteristic curve 114 may be switched to the characteristic curve 113 by reducing the amount of light that is emitted from the light emitting device 12, shortening the exposure time, or increasing the aperture value. The characteristic curve 112 may not necessarily be switched to the characteristic curve 113 or the characteristic curve 114 may not necessarily be switched to the characteristic curve 113 to set image capturing conditions for capturing a next image. Rather, the characteristic curve 112 may gradually be switched to the characteristic curve 113 at a certain rate or the characteristic curve 114 may gradually be switched to the characteristic curve 113 at a certain rate after a succession of images are captured according to the characteristic curve 112 or the characteristic curve 114.

The image capturing conditions may be changed to image capturing conditions represented by a characteristic curve according to which the pixel values generated by the pixels which detect light reflected from the portion of the subject 111 that is located in a closest position at the distance Z2 are saturated. However, since the distance up to the subject 111 is measured in the pre-measurement mode, the measured distance up to the subject may possibly be not accurate. In addition, as the subject may move with time, the subject may actually be in a position closer to the image capturing unit 14 than the closest position at the distance Z2. In these cases, the pixels that have detected the light reflected from the subject 111 tend to cause an overflow of accumulated electric charges. Accordingly, it is preferable to use a threshold value which is produced by subtracting a constant value or a constant rate from the saturated pixel values.

Since the pixel values depend on not only the distance up to the subject, but also the reflectance of the subject, if the subject 111 has a reflectance distribution, then the pixels whose pixel values represent the closest position at the distance Z2 may not necessarily be the same as the pixels whose pixel values are maximum. In this case, the characteristic curve 113 is adjusted to use the maximum pixel values as a threshold value. Therefore, it should be noted that the phrase "the closest position at the distance Z2" is used to simply explain that the obtained pixel values are maximum.

FIGS. 3A and 3B are diagrams illustrative of characteristic curves representing image capturing conditions required to obtain image distance data needed for a combining process in the event that there are a plurality of subjects. FIG. 3A shows a histogram of a subject 131 distributed between a distance Z5 and a distance Z6 and a subject 132 distributed between a distance Z7 and a distance Z8. The histogram shown in FIG. 3A is produced in the pre-measurement mode.

FIG. 3B shows characteristic curves, which represent image capturing conditions, that are optimum for measuring the distances up to the subject 131 and the subject 132. For accurately measuring the distance up to the subject 131, an image of the subject 131 is captured under the image capturing conditions that are represented by a characteristic curve 141 according to which the pixel values of the pixels that detect the light reflected from a portion of the subject 131 that is located in a closest position at the distance Z5 serve as a threshold value. The pixel values of the pixels that detect the light reflected from the portion of the subject 131 thus have a high resolution to measure the distance up to the subject 131 with higher accuracy. The subject 132 is present in a position at a distance which makes the accuracy of distance measurement lower if an image of the subject 132 is captured under the image capturing conditions that are represented by the characteristic curve 141, or is present in a position farther than that distance. For accurately measuring the distance up to the subject 132, an image of the subject 132 is captured under the image capturing conditions that are represented by a characteristic curve 142 according to which the pixel values of the pixels that detect the light reflected from a portion of the subject 132 that is located in a closest position at the distance Z7 serve as a threshold value.

The pixel values of the pixels that detect the light reflected from the portion of the subject 132 thus have a high resolution to measure the distance up to the subject 132 with higher accuracy. In the case where a plurality of subjects are present in a large distance range including a short distance and a long distance, as described above, if both the short distance and the long distance are to be measured with high accuracy, then it is necessary to selectively combine pixel values generated under two or more different image capturing conditions to generate image distance data with a wide dynamic range.

For example, under the image capturing conditions represented by the characteristic curve 141, the distance up to the subject 131 that is present between the distance Z5 and the distance Z6 can be measured with high accuracy, but the distance up to the subject 132 that is present between the distance Z7 and the distance Z8 cannot be measured with high accuracy. That is, the subject 132 that is present between the distance Z7 and the distance Z8 is measured with low accuracy. Under the image capturing conditions represented by the characteristic curve 142, the distance up to the subject 132 that is present between the distance Z7 and the distance Z8 can be measured with high accuracy, but the distance up to the subject 131 that is present between the distance Z5 and the distance Z6 cannot be measured because the pixels that have detected the light reflected from the subject 131 cause an overflow of accumulated electric charges. Therefore, the distances up to the subjects 131, 132 are measured under the image capturing conditions that are suitable for the respective subjects 131, 132. It is assumed that the subject 132 is present at a position farther than a distance which makes the accuracy of distance measurement lower than a certain value if an image of the subject 132 is captured under the image capturing conditions according to which the pixel values of the pixels which detect light reflected from the portion of the subject 131 at the distance Z5 serve as a threshold value.

The image distance data synthesizer 20 synthesizes the image distance data of the subject 131 converted from the image captured under the image capturing conditions represented by the characteristic curve 141 and the image distance data of the subject 132 converted from the image captured under the image capturing conditions represented by the characteristic curve 142 to generate image distance data with a wide dynamic range. Specifically, the image distance data synthesizer 20 identifies the image area of the subject 131 from the image distance data obtained under the image capturing conditions represented by the characteristic curve 141 and also identifies the image area of the subject 132 from the image distance data obtained under the image capturing conditions represented by the characteristic curve 142. Then, the image distance data synthesizer 20 combines the image distance data of the identified image areas to generate image distance data with a wide dynamic range.

Figure 4A:
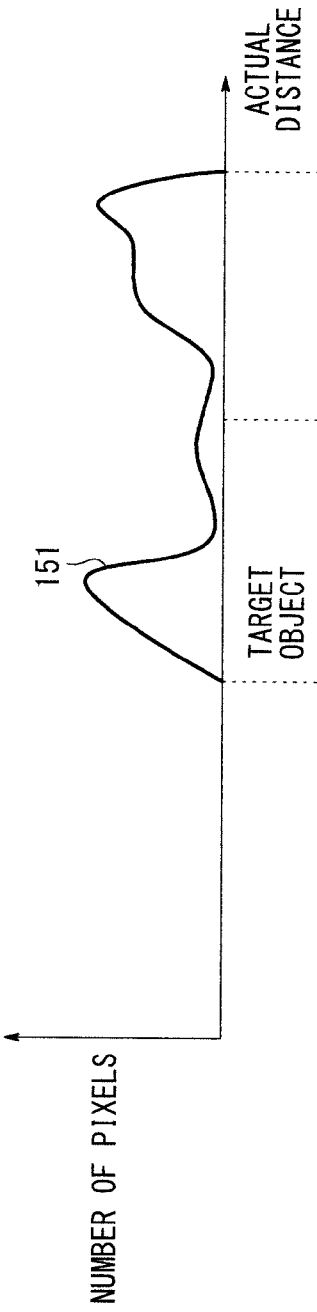
FIGS. 4A and 4B are diagrams illustrative of characteristic curves representing image capturing conditions required to obtain image distance data needed for a combining process in the event that a subject extends in a wide range from a short distance to a long distance.
Figure 4B:
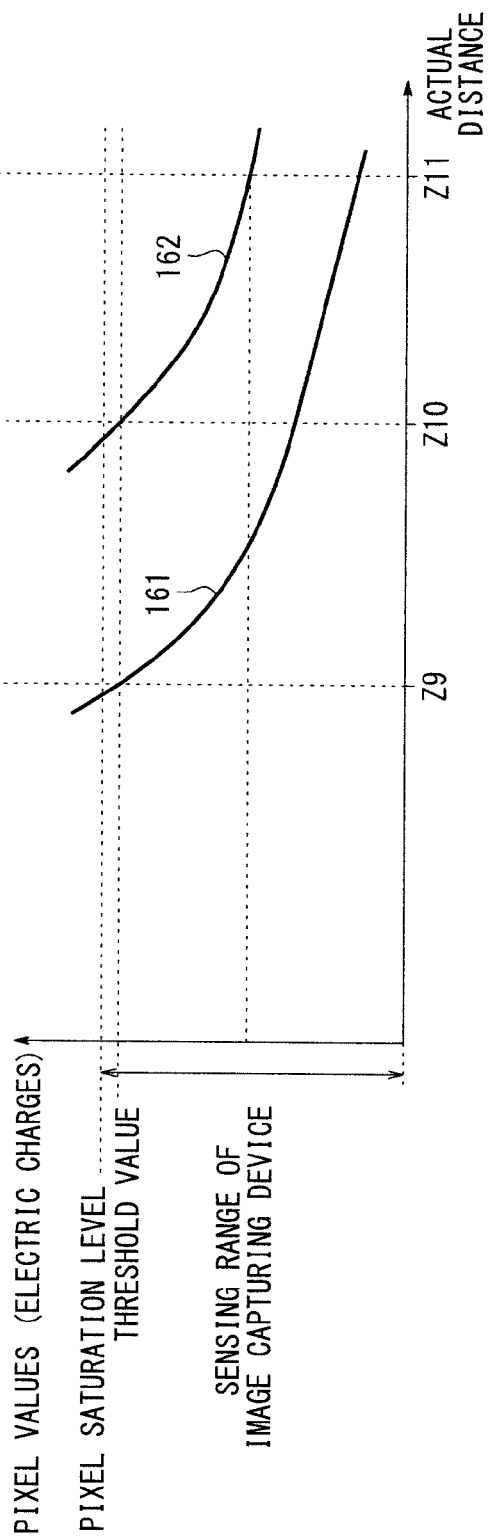

FIGS. 4A and 4B are diagrams illustrative of characteristic curves representing image capturing conditions required to obtain image distance data needed for a combining process in the event that a subject extends in a wide range from a short distance to a long distance. FIG. 4A shows a histogram of a subject 151 distributed between a distance Z9 and a distance Z11. The histogram shown in FIG. 4A is produced in the pre-measurement mode.

FIG. 4B shows characteristic curves, which represent image capturing conditions, that are optimum for measuring the distances up to the subject 151. For accurately measuring the distance up to the subject 151, an image of the subject 151 is captured under the image capturing conditions that are represented by a characteristic curve 161 according to which the pixel values of the pixels that detect the light reflected from a portion of the subject 151 that is located in a closest position at the distance Z9 serve as a threshold value. However, the image capturing conditions represented by the characteristic curve 161 are not effective to increase the accuracy with which to measure the distance up to a portion of the subject which is located in a position farther than a distance Z10 between the distances Z9, Z11. The distance Z10 is a distance at which the resolution of the pixel values according to the characteristic curve 161 is lowered. In other words, the distance Z10 is a distance at which the accuracy of distance measurement starts to become lower than a desired value. In order to increase the accuracy with which to measure the distance up to the portion of the subject 151 which is located in the position farther than the distance Z10, an image of the subject 151 is captured under the image capturing conditions that are represented by a characteristic curve 162 according to which the pixel values of the pixels that detect the light reflected from the portion of the subject 151 at the distance Z10 serve as a threshold value. The image distance data synthesizer 20 combines the image distance data of the portion of the subject 151 between the distances Z9, Z10 converted from the image captured under the image capturing conditions represented by the characteristic curve 161 and the image distance data of the portion of the subject 151 between the distances Z10, Z11 converted from the image captured under the image capturing conditions represented by the characteristic curve 162 to generate image distance data with a wide dynamic range.

Specifically, the image distance data synthesizer 20 identifies the image area of the portion of the subject 151 between the distances Z9, Z10 from the image distance data obtained under the image capturing conditions represented by the characteristic curve 161 and also identifies the image area of the portion of the subject 151 between the distances Z10, Z11 from the image distance data obtained under the image capturing conditions represented by the characteristic curve 162. Then, the image distance data synthesizer 20 synthesizes the image distance data of the identified image areas to generate image distance data with a wide dynamic range.

A process of calculating an accuracy of distance measurement will be described below. An accuracy of distance measurement refers to a fluctuation between a plurality of frames generated when an image is captured under the same image capturing conditions. According to one direct way of calculating an accuracy of distance measurement, a variance value of pixel values is determined from a plurality of frames, and the standard deviation of the variance value is used as a fluctuation and converted into a distance, so that a measurement error of the distance can be determined. Though this process may be used to calculate the accuracy of distance measurement, it requires a plurality of frames to be stored. According to the present embodiment, a process of logically calculating and predicting an accuracy of distance measurement is employed.

Prior to describing an accuracy of distance measurement, the principles of measuring a distance according to the TOF process will be described below. Processing details and equations to be described below are used to present a simple explanation of the principles, and belong to only one form of the TOF process. As described above, the amount of light emitted from the light source is attenuated in proportion to the square of the distance that the light has traveled. While the light source is emitting light steadily, an electric charge $Q_1$ that is converted from the light reflected from the subject by the image capturing device 44 is expressed as:

$$Q_1 = k/z^2 \tag{1}$$

where z represents the distance from the light source to the subject, and k a coefficient determined by the image capturing conditions, the reflectance of the subject, the transmittance of the lens 40, and the photoelectric conversion ratio of the image capturing device 44. By modifying the equation (1), the distance z is expressed as:

$$z = (k/Q_1)^{1/2} \tag{2}$$

Figure 5:
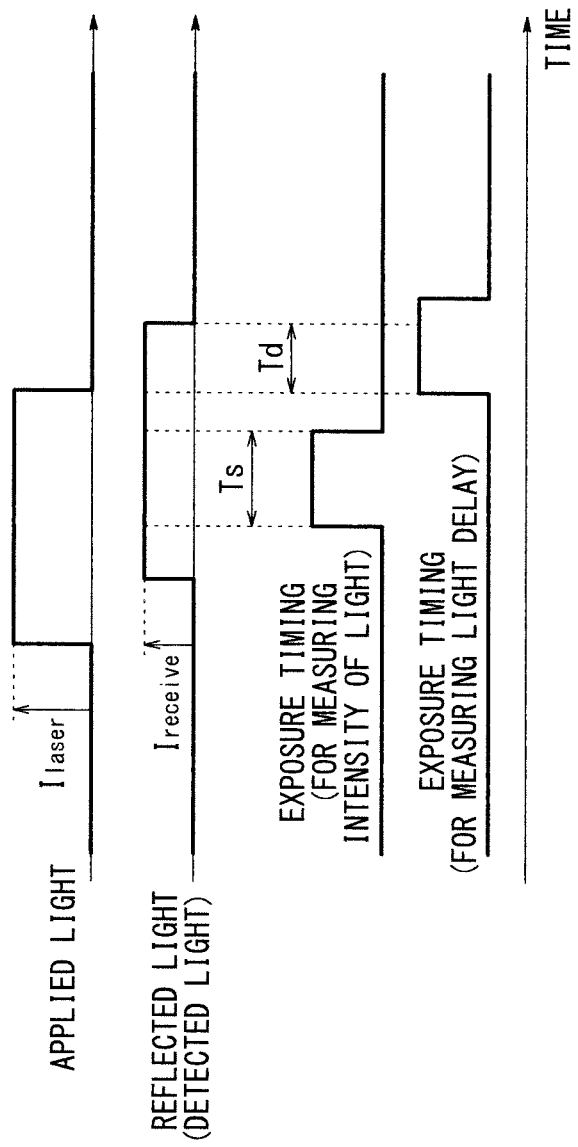
FIG. 5 is a timing chart showing exposure timings.

As shown in FIG. 5, exposure to the reflected light is started at the same time that the light source finishes its light emission, and an electric charge $Q_2$ that is generated and accumulated by being exposed to the reflected light is measured during the period of delay time Td in which the emitted light is reflected from the subject and returns. The delay time Td is expressed as:

$$Td = 2z/c \tag{3}$$

where c represents the speed of light. It is assumed that the image capturing device 44 is exposed to the reflected light during an exposure time Ts for measuring the intensity of the reflected light. Now, an electric charge $Q_2$ that is generated and accumulated by the image capturing device 44 during the exposure time Ts can be calculated based on its ratio to the electric charge $Q_1$, as follows:

$$Q_2 = Q_1 \times Td/Ts \tag{4}$$

By substituting the equations (1), (3) into the equation (4), the electric charge $Q_2$ is expressed as:

$$Q_2 = 2/(Ts \times c) \times k/z \tag{5}$$

Therefore, it can be seen that the electric charge $Q_2$ is attenuated depending on the distance z. By substituting the equation (3) into the equation (4), the electric charge $Q_2$ is expressed as:

$$Q_2 = Q_1 \times 2z/(Ts \times c)$$

which can be modified to determine the distance z as follows:

$$z = (Ts \times c)/2 \times Q_2/Q_1 \tag{6}$$

Consequently, the distance up to the subject can be measured based on the ratio of the accumulated electric charges $Q_2$, $Q_1$.

The pattern of the light emission and the exposure shown in FIG. 5 may be repeated during the period of one frame, and the electric charges generated by the photoelectric conversions may be integrated to generate pixel values having a high S/N ratio. The essential exposure time is adjusted based on the number of times that the pattern of the light emission and the exposure is repeated. The image capturing device 44 may be of a structure capable of holding a plurality of electric charges. Specifically, the image capturing device 44 may simultaneously hold the accumulated electric charges $Q_1$, $Q_2$ according to the pattern of the light emission and the exposure shown in FIG. 5, and the accumulated electric charges $Q_1$, $Q_2$ that are held may be read. While the effect of ambient light such as sunlight, indoor illumination, etc. has been neglected for illustrative purposes, it is obvious that the effect of ambient light can be eliminated by using image captured in the absence of the light emitted by the light source. According to the present embodiment, it is thus possible to measure the distance without suffering from the effect of ambient light.

Fluctuations of the accumulated electric charges $Q_1$, $Q_2$ and the exposure time Ts can be measured in advanced and predicted. Therefore, the accuracy with which to measure the distance z can be calculated based on the equation (6) according to the law of propagation of errors. The law of propagation of errors refers to a process of determining a variance of a value, e.g., the distance z that is indirectly determined from a variance of a known measured value, e.g., the accumulated electric charges $Q_1$, $Q_2$ and the exposure time Ts. Since the law of propagation of errors is generally widely known, it will not be described below. A distance at which the accuracy with which to measure the distance z is lower than a certain value may be used as the distance Z10.

Fluctuations of the accumulated electric charges $Q_1$, $Q_2$ and the exposure time Ts may be converted into respective errors of the distance z, and the sum of the errors may be calculated. Such a process will be described below. It is assumed that a fluctuation (standard deviation) of the electric charge $Q_1$ is represented by $\Delta Q_1$, and a measurement error $\Delta z_1$ caused by the fluctuation $\Delta Q_1$ is determined. The equation (2) is differentiated with respect to $Q_1$ to obtain:

$$\Delta z_1/\Delta Q_1 = k^{1/2} \times (-1/2) \times Q_1^{-3/2}$$

By substituting the equation (1) into the above equation, the above equation is modified as follows:

$$\Delta z_1/\Delta Q_1 = k^{1/2} \times (-1/2) \times (k/z^2)^{-3/2}$$
$$= -1/(2k) \times z^3$$

Therefore, $$|z_1/\Delta Q_1| = (1/2) \times k^{-1} \times z^3 \qquad (7)$$

Figure 6:
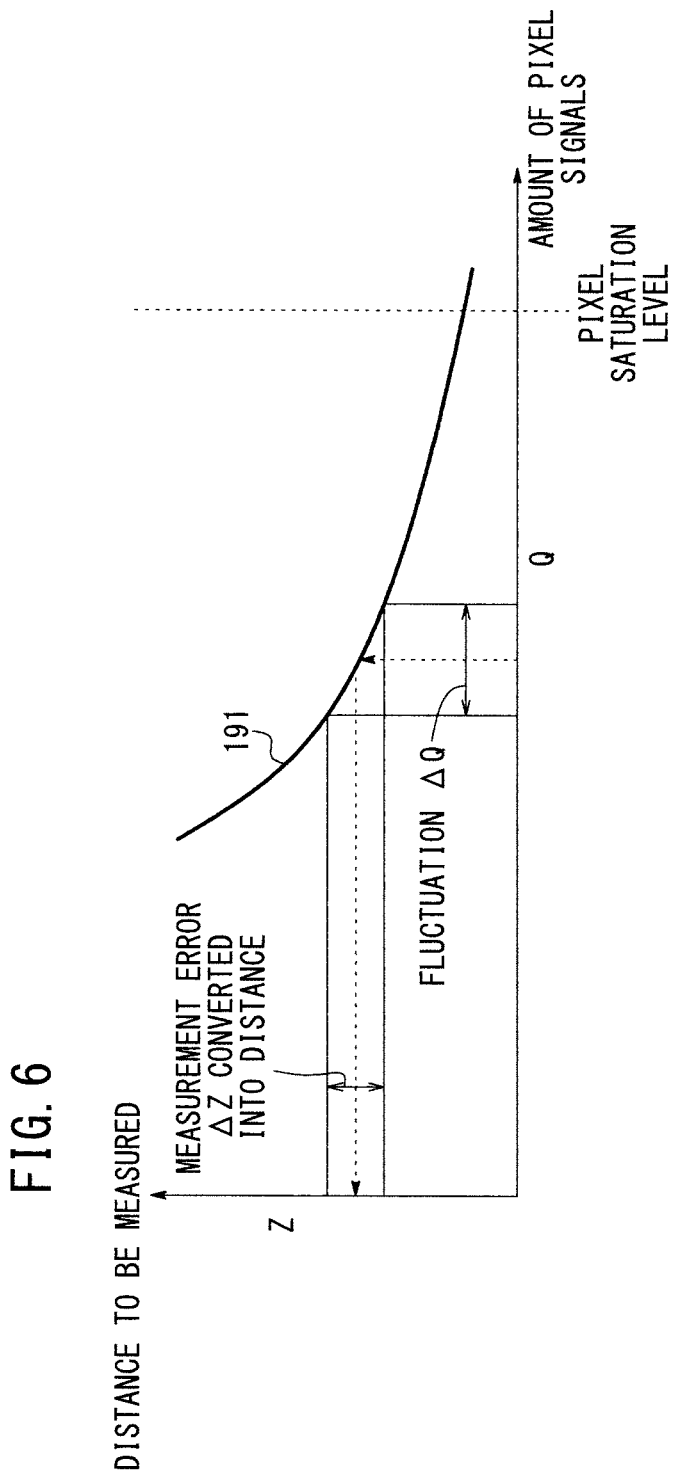
FIG. 6 is a diagram illustrative of the conversion from a fluctuation of an accumulated electric charge into a distance measurement error.

FIG. 6 is a diagram illustrative of the conversion from a fluctuation of an accumulated electric charge into a distance measurement error. If it is assumed that a characteristic curve 191 shown in FIG. 6 is represented by the equation (2), then the equation (7) represents the gradient of the characteristic curve 191. The gradient of the characteristic curve 191 during the period of the fluctuation $\Delta Q_1$ is linearly approximated to determine a distance measurement error $\Delta z_1$, as follows:

$$|\Delta z_1| = (1/2) \times k^{-1} \times z^3 \times |\Delta Q_1| \qquad (8)$$

The fluctuation $\Delta Q_1$ of the electric charge $Q_1$ which is output from the image capturing device 44 represents, for example, the sum of fluctuations caused by optical shot noise, circuit-derived noise, quantization noise, etc.

Then, it is assumed that a fluctuation (standard deviation) of the electric charge $Q_2$ is represented by $\Delta Q_2$, and a measurement error $\Delta z_2$ caused by the fluctuation $\Delta Q_2$ is determined. The equation (5) is modified to determine the distance z as follows:

$$z = 2/(Ts \times c) \times k/Q_2 \qquad (9)$$

The equation (9) is differentiated with respect to $Q_2$ to obtain:

$$\Delta z_2/\Delta Q_2 = -2k/(Ts \times c) \times 1/Q_2^2$$
$$= -2k/(Ts \times c) \times 1/(k/z \times 2/(Ts \times c))^2$$
$$= -2k/(Ts \times c) \times (z \times Ts \times c)^2/(2k)^2$$
$$= -(1/2) \times Ts \times c \times k^{-1} \times z^2$$

Therefore, $$|\Delta z_2/\Delta Q_2| = (1/2) \times Ts \times c \times k^{-1} \times z^2 \qquad (10)$$

The gradient of the characteristic curve 191 during the period of the fluctuation $\Delta Q_2$ is linearly approximated to determine a distance measurement error $\Delta z_2$, as follows:

$$|\Delta z_2| = (1/2) \times Ts \times c \times k^{-1} \times z^2 \times |\Delta Q_2| \qquad (11)$$

Finally, it is assumed that a fluctuation (standard deviation) of the exposure time Ts which is caused by signal jitter is represented by $\Delta Ts$. Since a delay of light is measured, the distance that the light travels during the exposure time Ts represents a distance conversion error. If a distance measurement error converted from the fluctuation $\Delta Ts$ is represented by $\Delta z_3$, then it is expressed as:

$$\Delta z_3 = c \times \Delta Ts \qquad (12)$$

The sum of the values determined by the equations (8), (11), and (12) represents a distance measurement error (standard deviation) $\Delta z$, which is expressed as:

$$\Delta z = (|\Delta z_1|^2 + |\Delta z_2|^2 + |\Delta z_3|^2)^{1/2} \qquad (13)$$

The distance measurement error $\Delta z$ represents a distance measurement accuracy. Specifically, the distance z is determined by the equation (6), and a corresponding distance measurement error $\Delta z$ is also determined. As the distance measurement error $\Delta z$ increases, the distance measurement accuracy decreases. The distance which corresponds to a distance measurement error $\Delta z$ that is in excess of a predetermined value may be used as the distance Z10 shown in FIG. 4, for example.

The distance measurement error $\Delta z$ may be represented by either the distance measurement error $\Delta z_1$ or the distance measurement error $\Delta z_2$ for reducing the cost required for the calculations. Specifically, since the absolute value of the gradient of the characteristic curve with respect to either one of the electric charges $Q_1$, $Q_2$ serves as a general indication of the distance measurement accuracy, the position at the distance where the absolute value of the gradient of the characteristic curve represented by the set image capturing conditions is smaller than a certain value may be used as the position at the distance where the distance measurement accuracy is worse than a certain value. Alternatively, the position at the distance where the subject is present and where the pixel values of the pixels that detect the light reflected from the subject are smaller than a certain value may be used as the position at the distance where the distance measurement accuracy is worse than a certain value.

Figure 7:
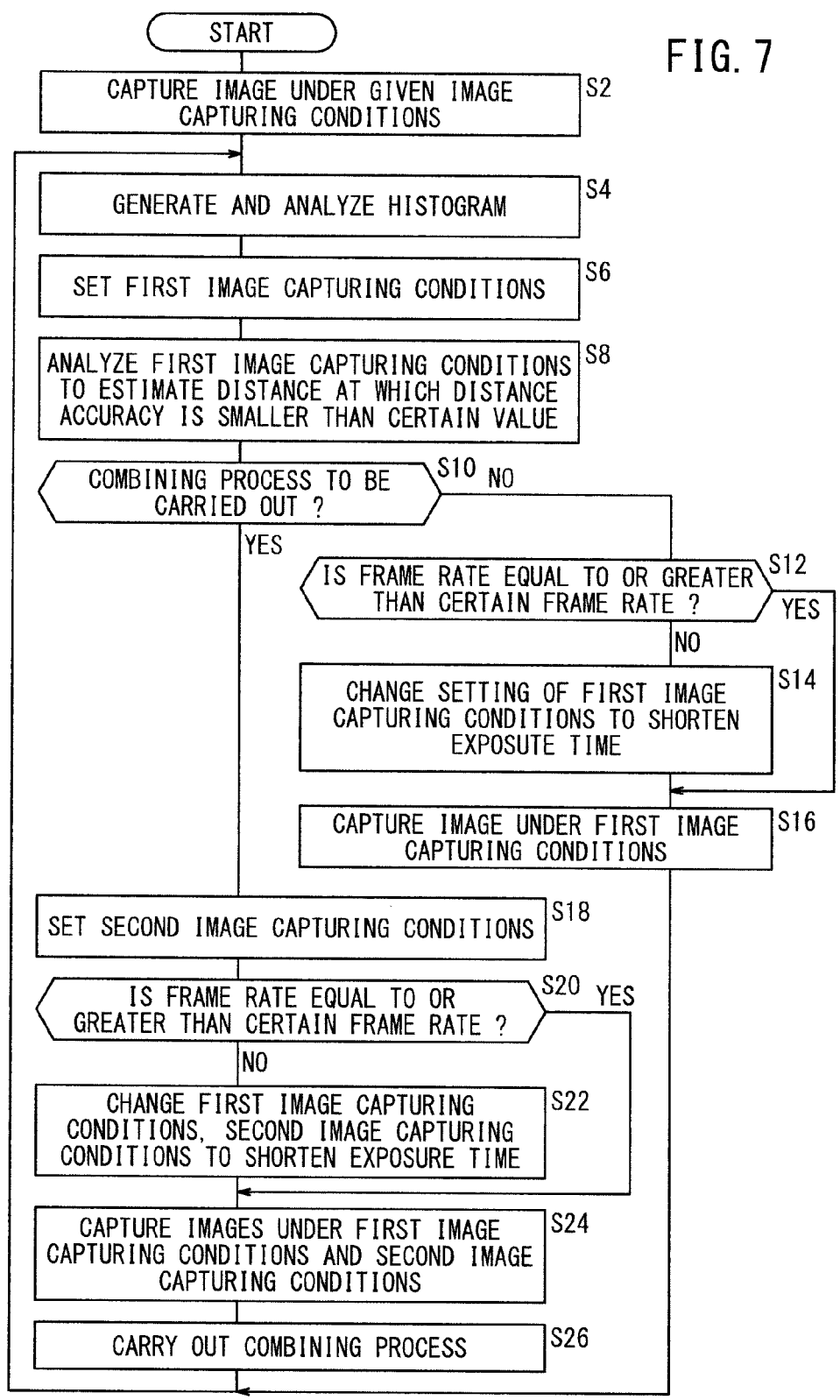
FIG. 7 is a flowchart of an operation sequence of the distance measuring apparatus.

Operation of the distance measuring apparatus 10 will be described below with reference to a flowchart shown in FIG. 7.

The image capture controller 52 controls the image capturing unit 14 to capture an image of a subject under given image capturing conditions (step S2). The image capture controller 52 may alternately control the image capturing unit 14 to capture images of subjects under desired image capturing conditions. Image data of the captured image are converted by the image distance data converter 16 into image distance data, which are output to the image capturing condition setting section 50.

Based on the image distance data, the image capturing condition setting section 50 generates a histogram of the subjects and analyzes the histogram (step S4). The image capturing condition setting section 50 analyzes the histogram to identify a closest one of the subjects. In other words, the image capturing condition setting section 50 identifies a distance indicated by the shortest (closest) one of a plurality of image distance data. In FIG. 2, the distance Z2 is the closest distance or position. In FIG. 3, the distance Z5 is the closest distance or position. In FIG. 4, the distance Z9 is the closest distance or position.

The image capturing condition setting section 50 may identify the closest image distance data not from the entire area of the image distance data, but from a certain area within the entire area. The certain area may be an area selected by the user or a predetermined area (e.g., a central area of the image). Normally, the user captures an image of a subject, the distance to which is to be measured, so that the subject will be positioned in the certain area in the image.

Then, the image capturing condition setting section 50 sets first image capturing conditions based on the identified distance (step S6). Specifically, the image capturing condition setting section 50 sets first image capturing conditions such that the pixel values of the pixels that detect light reflected from the subject at the identified distance serve as a threshold value. In other words, the image capturing condition setting section 50 sets first image capturing conditions such that pixel values of the pixels whose image distance data represent the shortest distance serve as a threshold value. The image capturing condition setting section 50 outputs the set first image capturing conditions to the distance measurement accuracy analyzer 54.

Then, the distance measurement accuracy analyzer analyzes the histogram generated in step S4 and the first image capturing conditions to estimate a distance (a position at a distance) at which the distance measurement accuracy is lower than a certain value (step S8). If the image capturing conditions are known, it is possible to predict electric charges ($Q_1$, $Q_2$) accumulated in the pixels by the light applied thereto from the light emitting device 12 and characteristics of the accumulated electric charges ($Q_1$, $Q_2$), and the distance measurement accuracy can be estimated according to the process described above.

Then, the distance measurement accuracy analyzer 54 judges whether a combining process is to be carried out or not (step S10). Specifically, the distance measurement accuracy analyzer 54 judges whether the subject is present in a position farther than the distance estimated in step S8 or not. If the subject is present in such a position, then the distance measurement accuracy analyzer 54 decides that the combining process is to be carried out. More specifically, the distance measurement accuracy analyzer 54 judges whether the combining process is to be carried out or not by judging whether there are image distance data representing a distance farther than the distance estimated in step S8 or not. The distance measurement accuracy analyzer 54 outputs the decision result to the image capturing condition setting section 50.

For example, if the estimated distance is in the range from the distance Z6 to the distance Z7, as shown in FIG. 3, then since the subject 132 is present in a position at the estimated distance and farther than the estimated distance, the distance measurement accuracy analyzer 54 decides that the combining process is to be carried out. If the estimated distance is the distance Z10, as shown in FIG. 4, then since a portion of the subject 151 is present in a position at the estimated distance and farther than the estimated distance, the distance measurement accuracy analyzer 54 decides that the combining process is to be carried out. If a certain area is to be taken into account, then the distance measurement accuracy analyzer 54 judges whether there is a subject farther than the estimated distance within the certain area or not. In other words, the distance measurement accuracy analyzer 54 may judge whether there are image distance data farther than the identified distance, among the image distance data in the certain area or not.

If the distance measurement accuracy analyzer 54 decides that the combining process is not to be carried out in step S10, then the image capturing condition setting section 50 judges whether or not the frame rate at which to capture images under the first image capturing conditions set in step S6 is equal to or greater than a certain frame rate (step S12). The certain frame rate may be a predetermined frame rate or may be a desired frame rate determined by the user.

If it is decided that the frame rate is not equal to or greater than the certain frame rate in step S12, then the image capturing condition setting section 50 changes the setting of the first image capturing conditions set in step S6 to shorten the exposure time (step S14), and then control goes to step S16. At this time, since the amount of exposure is reduced due to the shortened exposure time, the image capturing condition setting section 50 may reduce the aperture value, increase the gain value, or increase the intensity of the emitted light in order to make up for the reduction in the amount of exposure. In this case, the image capturing condition setting section 50 outputs the first image capturing conditions with the setting changed in step S14 to the image capture controller 52.

If it is decided that the frame rate is equal to or greater than the certain frame rate in step S12, then control jumps to step S16. In this case, the image capturing condition setting section 50 outputs the first image capturing conditions set in step S6 to the image capture controller 52.

In step S16, the image capture controller 52 controls the image capturing unit 14 to capture an image of the subject under the first image capturing conditions which have been set as the latest first image capturing conditions. The image data of the image captured under the first image capturing conditions are converted by the image distance data converter 16 into image distance data, which are output from the image distance data output unit 22. In this manner, image data which are capable of keeping the distance measurement accuracy at a high level can be generated. After the image of the subject is captured in step S16, control goes back to step S4 to repeat the above sequence. In step S4 subsequent to step S16, the image capturing condition setting section 50 may generate a histogram based on the image data generated in step S16 and analyze the histogram.

If it is judged that the combining process is to be carried out in step S10, then the image capturing condition setting section 50 sets second image capturing conditions for producing a brighter image than the first image capturing conditions (step S18). Specifically, the image capturing condition setting section 50 identifies the position of a closest one of the subjects that are present in positions farther than the distance estimated in step S8, and sets second image capturing conditions based on the identified position. In other words, the image capturing condition setting section 50 sets second image capturing conditions such that the pixel values of the pixels that detect the light reflected from the subject in the identified position serves as a threshold value. More specifically, the image capturing condition setting section sets second image capturing conditions such that the pixel values of the pixels which produce a closest one of a plurality of image distance data farther than the estimated distance serve as a threshold value. The brighter image signifies an image which is brighter when it is captured of the same subject at the same distance in the same environment. Specifically, the brighter image can be captured by increasing the gain value, increasing the exposure time, reducing the aperture value, or increasing the intensity of the light emitted from the light source.

The position of the subject is identified in step S18 as follows: If the estimated distance is in the range from the distance Z6 to the distance Z7, as shown in FIG. 3, then the image capturing condition setting section 50 identifies the distance Z7 and sets second image capturing conditions such that the pixel values of the pixels that detect the light reflected from the subject 132 at the identified distance Z7 serves as a threshold value. If the estimated distance is the distance Z10, as shown in FIG. 4, then the image capturing condition setting section 50 identifies the distance Z10 and sets second image capturing conditions such that the pixel values of the pixels that detect the light reflected from the subject 132 at the identified distance Z10 serves as a threshold value.

Then, the image capturing condition setting section 50 judges whether or not a combined frame rate which represents the sum of the frame rate capable of capturing an image under the first image capturing conditions set in step S6 and the frame rate capable of capturing an image under the second image capturing conditions set in step S18 is equal to or greater than a certain frame rate (step S20). The certain frame rate used in step S20 may be different from the certain frame rate used in step S12.

If the frame rate is not equal to or greater than the certain frame rate in step S20, then the image capturing condition setting section 50 changes the setting of at least one of the first image capturing conditions set in step S6 and the second image capturing conditions set in step S18 to shorten the total exposure time under the first image capturing conditions and the second image capturing conditions (step S22), and then control goes to step S24. At this time, since the amount of exposure is reduced due to the shortened exposure time, the image capturing condition setting section 50 may reduce the aperture value, increase the gain value, or increase the intensity of the emitted light in order to make up for the reduction in the amount of exposure. The image capturing condition setting section 50 outputs the first image capturing conditions and the second image capturing conditions with the setting changed in step S22 to the image capture controller 52.

If the image capturing condition setting section decides that the combined frame rate is equal to or greater than the certain frame rate in step S20, then control jumps to step S24. In this case, the image capturing condition setting section 50 outputs the first image capturing conditions set in step S6 and the second image capturing conditions set in step S18 to the image capture controller 52.

In step S24, the image capture controller 52 controls the image capturing unit 14 to capture images of the subject under the first image capturing conditions and the second image capturing conditions which have been set as the latest first and second image capturing conditions.

Then, the image distance data synthesizer 20 synthesizes the image distance data converted from the image captured under the first image capturing conditions and the image distance data converted from the image captured under the second image capturing conditions (step S26). The image distance data synthesizer 20 uses the image distance data obtained under the first image capturing conditions as image distance data of a subject that is present at a distance shorter than the distance estimated in step S8, and also uses the image distance data obtained under the second image capturing conditions as image distance data of a subject that is present at a distance equal or longer than the estimated distance, thereby generating combined image distance data. The generated combined image distance data are output from the image distance data output unit 22. In this manner, the image distance data has a wide dynamic range for generating image data to keep the distance measurement accuracy at a high level.

The above embodiment may be modified as follows:

(1) If the image distance data obtained under the first image capturing conditions and the image distance data obtained under the second image capturing conditions are simply combined with each other while the subject is moving over and beyond the distance estimated in step S8, then the combined image distance data exhibits a subject discontinuity. In other words, the distance data of the subject become discontinuous. Accordingly, the distance data of the subject according to the image distance data obtained under the first image capturing conditions and the distance data of the subject according to the image distance data obtained under the second image capturing conditions may be weighted and then combined with each other to obtain smooth distance data of the subject.

(2) In the above embodiment, the threshold value is constant. However, the threshold value may be varied depending on the degree to which the distance up to the subject changes. For example, if the degree to which the distance up to the subject changes is high, i.e., if the degree to which the distance changes is high as determined by comparing the image distance data obtained from image data captured previously and the image distance data obtained from image data captured subsequently, then the threshold value may be spaced from the saturated pixel value. This is because as the degree to which the distance up to the subject changes is higher, the possibility that the obtained image distance data are not accurate is higher, and if the threshold value is brought closer to the saturated pixel value in this case, an overflow of accumulated electric charges occurs, as described above. The threshold value is changed as follows: The controller 18 additionally includes a distance change calculator and a threshold value changer. The distance change calculator calculates the degree to which the distance up to the subject changes. The distance change calculator can calculate the degree to which the distance up to the subject changes by comparing image distance data. The threshold value changer changes the threshold value depending on the calculated degree to which the distance up to the subject changes. The image capturing condition setting section sets at least one of the first image capturing conditions and the second image capturing conditions using the threshold value changed by the threshold value changer.

(3) In the above embodiment, the threshold value (referred to as a first threshold value) used in setting the first image capturing conditions and the threshold value (referred to as a second threshold value) used in setting the second image capturing conditions are the same as each other. However, they may be different threshold values. As the subject is positioned farther, the distance measurement accuracy tends to be lower. Therefore, the difference between the second threshold value and the saturated pixel value may be greater than the difference between the first threshold value and the saturated pixel value.

(4) In the above modifications (2) and (3), the threshold value changer may change at least one of the first threshold value and the second threshold value depending on the degree to which the distance changes. In this case, the threshold value changer may change at least one of the first threshold value and the second threshold value such that the difference between the second threshold value and the saturated pixel value may be greater than the difference between the first threshold value and the saturated pixel value.

(5) In the above modifications (2), (3), and (4), the threshold value is changed depending on the degree to which the distance changes. Since the pixel values actually depend also on the reflectance of the subject, the threshold value may be additionally changed depending on the distribution of reflectance of the subject. For example, if the subject has a large distribution of reflectance, then the generated pixel values also have a large distribution. Accordingly, the threshold value may be set to leave a margin for the saturation of pixel values to make the distance measuring apparatus able to deal with changes in the subject. The distribution of reflectance may be derived from the equation (2), or image data generated in the absence of the light emitted by the light source may be used.

(6) In the above embodiment, image capturing conditions are set using one image distance data (including combined image distance data) obtained from image data captured as the latest image data. However, image capturing conditions may be set using a plurality of image distance data obtained from a succession of image data captured under the same image capturing conditions. The distance measurement accuracy is made higher by judging the distance up to the subject from a plurality of image distance data and setting image capturing conditions, than by setting image capturing conditions with one image distance data. This process is particularly effective when the subject is not a mobile body. Therefore, the controller 18 may calculate the degree to which the distance up to the subject changes, and may change the number of image distance data used in setting image capturing conditions, depending on the calculated degree to which the distance up to the subject changes. If the degree to which the distance up to the subject changes is small, then the controller sets image capturing conditions after obtaining 20 image distance data from 20 successive image data that are captured, for example. In this case, the image capturing conditions are changed each time 20 image data are captured. If the degree to which the distance up to the subject changes is relatively large, then the controller sets next image capturing conditions using two image distance data from two successive image data that are captured, for example. In this case, the image capturing conditions are changed each time two image data are captured.

(7) In the above embodiment, the two image distance data obtained under the first image capturing conditions and the second image capturing conditions are combined with each other. However, three image distance data obtained under three sets of image capturing conditions may be combined with each other. For example, if there is a subject spaced farther than the position where the distance measurement accuracy under the first image capturing conditions is lower than a certain value, then image distance data are obtained under the second image capturing conditions, and if there is a subject spaced farther than the position where the distance measurement accuracy under the second image capturing conditions is lower than a certain value, then image distance data are obtained under the third image capturing conditions. In this manner, image distance data may be obtained under a plurality of sets of image capturing conditions, and the obtained image distance data may be combined with each other.

(8) The image distance data obtained in steps S16, S26 are image distance data with high distance measurement accuracy. Therefore, when control returns from one of steps S16, S26 to step S4, the saturated pixel value at which the pixel values are saturated or a value close to the saturated pixel value may be used instead of the threshold value that is used in setting image capturing conditions in steps S6, S18. Alternatively, the threshold value may be brought closer stepwise to the saturated pixel value. The range of pixel values with a high resolution can thus be increased.

(9) In the above embodiment, after the image distance data obtained under the first image capturing conditions and the image distance data obtained under the second image capturing conditions are combined with each other, the image distance data obtained again under the first image capturing conditions and the image distance data obtained again under the second image capturing conditions are combined with each other. According to this process, the time interval of the combined image distance data is longer than the time interval of the image distance data converted from the image data. Therefore, the image distance data converted from the image data captured by the image capturing unit 14 and image distance data obtained immediately after those image distance data may be combined with each other.

Figure 8:
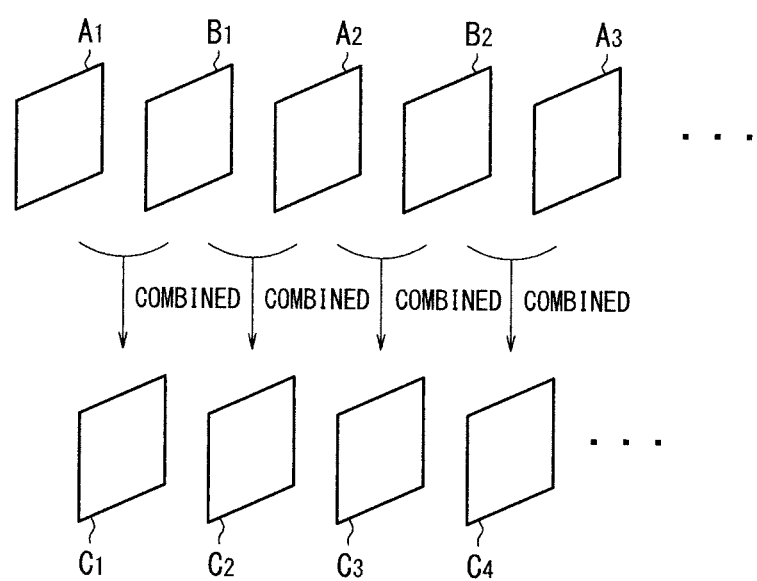
FIG. 8 is a diagram schematically showing combined image distance data that are generated from image distance data.

FIG. 8 is a diagram schematically showing combined image distance data that are generated from image distance data. Image distance data converted successively from image data captured by the image capturing unit 14 are indicated as frame A1, frame B1, frame A2, frame B2, frame A3, . . . . Frames A represent the image distance data obtained under the first image capturing conditions. Frames B represent the image distance data obtained under the second image capturing conditions. The image distance data synthesizer 20 generates combined image distance data C1 from frame A1 and frame B1, and also generates combined image distance data C2 from frame B1 and frame A2. The image distance data synthesizer 20 generates combined image distance data C3 from frame A2 and frame B2, and also generates combined image distance data C4 from frame B2 and frame A3. In this manner, the image distance data synthesizer 20 generates combined image distance data successively from successive image distance data and image distance data obtained immediately after those image distance data.

(10) In the above embodiment, the image capturing condition setting section 50 generates a histogram. However, the image capturing condition setting section 50 may not generate a histogram insofar as it can recognize a distribution of distances up to subjects.

(11) In the above embodiment, the image distance data obtained under the first image capturing conditions and the image distance data obtained under the second image capturing conditions are combined with each other. However, they may not be combined with each other because the distance measurement accuracy can be increased even if they are not combined with each other.

(12) In the above embodiment, the frame rate is set to be equal to or greater than the certain frame rate. However, even if the frame rate can be equal to or greater than the certain frame rate, a blanking period may be inserted after the data are output and may be adjusted to output the data at equal intervals at the certain frame rate (e.g., 30 fps). This is because the user may find it easier to handle a fixed frame rate than to deal with a frame rate that changes depending on changes in the subject. Furthermore, as the subject is present at a shorter distance, naturally the exposure time can be shorter and the frame rate can be higher while keeping the distance measurement accuracy. Consequently, the data may be output at a higher frame rate for a subject at a shorter distance. In applications for avoiding dangers, the risk of encountering dangers is higher as a subject is present at a shorter distance, requiring a higher frame rate.

(13) In the above embodiment, the two-dimensional image distance data are used. However, image data for generating one-dimensional image distance data may be captured.

(14) The image capturing device may not be a two-dimensional matrix of pixels because one- or two-dimensional image distance data can be obtained by an optical or mechanical scanning process using an image capturing device which comprises a single pixel or a one-dimensional array of pixels.

(15) In the above embodiment, the capturing of successive moving images is assumed. Optimum image capturing conditions may be predicted from the capturing of successive moving images, and a plurality of image distance data may be acquired under the predicted optimum image capturing conditions. This is because a plurality of image distance data obtained under the same image capturing conditions can be integrated to acquire more accurate one image distance data.

(16) In the above embodiment, the image capturing device comprises a two-dimensional matrix of pixels. However, the image capturing device may comprise a one-dimensional array of pixels. Image distance data representing a matrix of distance information can be obtained using the image capturing device including a one-dimensional array of pixels.

(17) The above modifications (1) through (16) may be combined in any appropriate patterns insofar as no resultant inconsistencies are included in the combinations.

While the embodiment of the present invention has been described above, the technical scope of the present invention is not limited to the description of the above embodiment. It is obvious to those skilled in the art that various modifications and improvements can be made to the above embodiment. It is clear from the scope of claims for patent that such modifications and improvements are covered by the technical scope of the present invention.

The invention claimed is:

1. A distance measuring apparatus comprising:
a light source for emitting light;
an image capturing unit for capturing an image of a subject based on the light emitted from the light source and reflected from the subject;
a distance information converter for converting pixel values of pixels which are obtained by the image capturing unit when the image capturing unit captures the image of the subject, into distance information representing a distance up to the subject;
an image capturing condition setting section for setting first image capturing conditions based on the distance information;
an image capture controller for controlling the light source and the image capturing unit to capture the image of the subject under the first image capturing conditions; and
a distance measurement accuracy analyzer for analyzing a distance measurement accuracy under the first image capturing conditions and identifying an accuracy lowering distance at which the distance measurement accuracy is worse than a certain value;

wherein the image capturing unit comprises a two-dimensional matrix of pixels; and
the distance information converter converts each of pixel values of the pixels which are generated when the image capturing unit captures the image of the subject, into distance information to obtain one image distance data.

2. The distance measuring apparatus according to claim 1, wherein the image capturing condition setting section sets the first image capturing conditions such that the pixel values of the pixels that detect light reflected from a subject positioned at a shortest distance serve as a first threshold value.

3. The distance measuring apparatus according to claim 2,
wherein the image capturing condition setting section sets second image capturing conditions for obtaining luminance information brighter than the first image capturing conditions if the subject is present at a distance farther than the accuracy lowering distance; and
the image capture controller controls the light source and the image capturing unit to capture the image of the subject under the first image capturing conditions and the second image capturing conditions.

4. The distance measuring apparatus according to claim 3, further comprising:
a distance information combiner for combining the distance information converted from the pixel values when the image of the subject is captured under the first image capturing conditions and the distance information converted from the pixel values when the image of the subject is captured under the second image capturing conditions, with each other.

5. The distance measuring apparatus according to claim 3, wherein the image capturing condition setting section sets second image capturing conditions such that the pixel values of the pixels that detect light reflected from a portion, located at a shortest distance, of the subject that is present at the distance farther than the accuracy lowering distance serve as a second threshold value.

6. The distance measuring apparatus according to claim 5, further comprising:
a distance change calculator for calculating a degree to which the distance up to the subject changes; and
a threshold value changer for changing at least one of the first threshold value and the second threshold value depending on the degree to which the distance up to the subject changes,
wherein
the distance change calculator calculates the degree to which the distance up to the subject changes by comparing a plurality of image distance data.

7. The distance measuring apparatus according to claim 5, wherein a difference between the second threshold value and a saturated pixel value is greater than a difference between the first threshold value and the saturated pixel value.

8. The distance measuring apparatus according to claim 1, wherein the subject comprises a subject whose image is captured in a certain area of the two-dimensional matrix of pixels.

9. A distance measuring method of controlling a distance measuring apparatus to measure a distance up to a subject, comprising:
the light emitting step of emitting light from a light source;
the image capturing step of capturing, with an image capturing unit, an image of the subject based on the light emitted from the light source and reflected from the subject;
the distance information converting step of converting, with a distance information converter, pixel values of pixels which are obtained by the image capturing unit when the image capturing unit captures the image of the subject, into distance information representing the distance up to the subject;

the image capturing condition setting step of setting, with an image capturing condition setting section, first image capturing conditions based on the distance information;

the image capture controlling step of controlling, with an image capture controller, the light source and the image capturing unit to capture the image of the subject under the first image capturing conditions; and the distance measurement accuracy analyzing step of analyzing, with a distance measurement accuracy analyzer, a distance measurement accuracy under the first image capturing conditions and identifying an accuracy lowering distance at which the distance measurement accuracy is worse than a certain value;

wherein the image capturing unit comprises a two-dirnensionai matrix of pixels; and in the distance information converting step, each of pixel values of the pixels which are generated when the image capturing unit captures the image of the subject, is converted into distance information to obtain one image distance data.

10. A distance measuring apparatus comprising;

a light source for emitting light;

an image capturing unit for capturing an image of a subject based on the light emitted from the light source and reflected from the subject;

a distance information converter for converting pixel values of pixels which are obtained by the image capturing unit when the image capturing unit captures the image of the subject, into distance information representing a distance up to the subject;

an image capturing condition setting section for setting first image capturing conditions based on the distance information, such that the pixel values of the pixels that detect light reflected from a subject positioned at a shortest distance serve as a first threshold value;

an image capture controller for controlling the light source and the image capturing unit to capture the image of the subject under the first image capturing conditions;

a distance change calculator for calculating a degree to which the distance up to the subject changes; and a threshold value changer for changing the first threshold value depending on the degree to which the distance up to the subject changes;

wherein the image capturing unit comprises a two-dimensional matrix of pixels;

the distance information converter converts each of pixel values of the pixels which are generated when the image capturing unit captures the image of the subject, into distance information to obtain one image distance data; and the distance change calculator calculates the degree to which the distance up to the subject changes by comparing a plurality of image distance data.

11. The distance measuring apparatus according to claim 10, further comprising:

a distance measurement accuracy analyzer for analyzing a distance measurement accuracy under the first image capturing conditions and identifying an accuracy lowering distance at which the distance measurement accuracy is worse than a certain value;

wherein the image capturing condition setting section sets second image capturing conditions for obtaining luminance information brighter than the first image capturing conditions if the subject is present at a distance farther than the accuracy lowering distance; and the image capture controller controls the light source and the image capturing unit to capture the image of the subject under the first image capturing conditions and the second image capturing conditions.

12. The distance measuring apparatus according to claim 11, further comprising:

a distance information combiner for combining the distance information converted from the pixel values when the image of the subject is captured under the first image capturing conditions and the distance information converted from the pixel values when the image of the subject is captured under the second image capturing conditions, with each other.

13. The distance measuring apparatus according to claim 11, wherein the image capturing condition setting section sets second image capturing conditions such that the pixel values of the pixels that detect light reflected from a portion, located at a shortest distance, of the subject that is present at the distance farther than the accuracy lowering distance serve as a second threshold value.

14. The distance measuring apparatus according to claim 13, wherein a difference between the second threshold value and a saturated pixel value is greater than a difference between the first threshold value and the saturated pixel value.

15. The distance measuring apparatus according to claim 10, wherein the subject comprises a subject whose image is captured in a certain area of the two-dimensional matrix of pixels.

* * * * *